Figure 1:
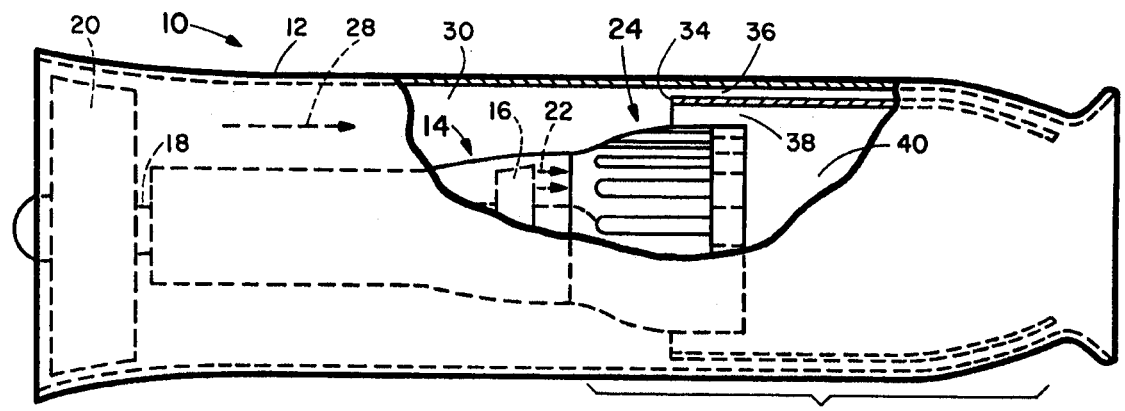
Figure 2:
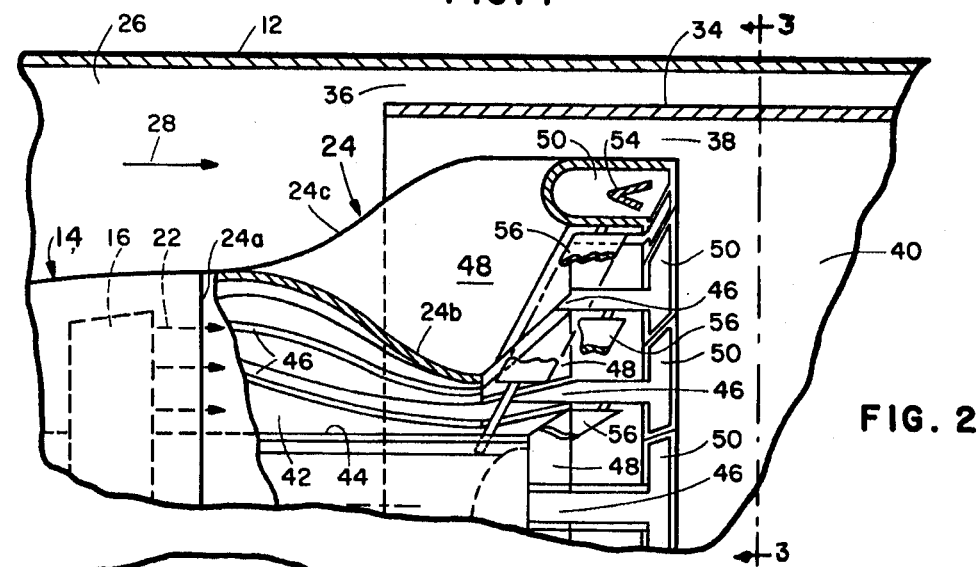
Figure 4:
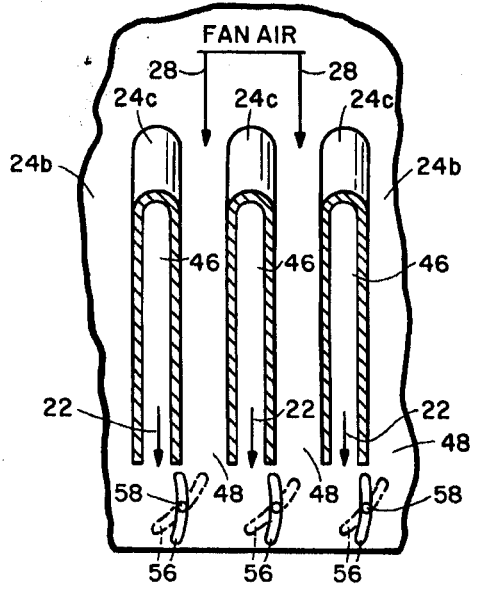
Figure 3:
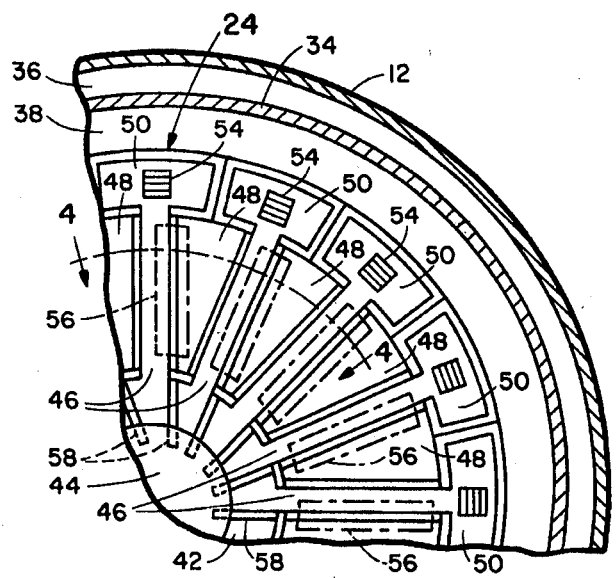

United States Patent [19]

DuBell

[11] Patent Number: 4,461,146

[45] Date of Patent: Jul. 24, 1984

[54] MIXED FLOW SWIRL AUGMENTOR FOR TURBOFAN ENGINE

[75] Inventor: Thomas L. DuBell, Palm Beach Gardens, Fla.

[73] Assignee: The United States of America as represented by the Secretary of the Navy, Washington, D.C.

[21] Appl. No.: 436,091

[22] Filed: Oct. 22, 1982

[51] Int. Cl.³ .............................................. F02K 3/10
[52] U.S. Cl. ........................................ 60/261; 60/262
[58] Field of Search .............. 60/261, 262, 263, 226.1, 60/737, 738

[56] References Cited

U.S. PATENT DOCUMENTS

| | | | |
|---|---|---|---|
| 3,747,345 | 7/1973 | Markowski | 60/261 |
| 3,750,402 | 8/1973 | Vdovlak et al. | 60/261 |
| 3,866,417 | 2/1975 | Velegol | 60/261 |
| 4,045,957 | 9/1977 | DiSabato | 60/262 |
| 4,072,008 | 2/1978 | Kenworthy et al. | 60/261 |
| 4,134,260 | 1/1979 | Lefebvre et al. | 60/261 |
| 4,203,285 | 5/1980 | Hanloser et al. | 60/261 |

Primary Examiner—Louis J. Casaregola
Assistant Examiner—Donald E. Stout
Attorney, Agent, or Firm—Robert F. Beers; Harvey A. David

[57] ABSTRACT

An augmentor in a turbofan jet engine utilizes a crossover chute assembly to direct portions of the bypass fan stream inwardly and portions of the hot core stream outwardly into alternating radial zones of fan and core stream flow; and also annularizes a portion of the core stream around those zones. A plurality of angularly positionable radial vanes causes rotational swirl of the radial zones in one direction to produce buoyant "g" forces that effect rapid inward propagation of a flame front from the annularized zone.

3 Claims, 4 Drawing Figures

U.S. Patent      Jul. 24, 1984      4,461,146

UNITED STATES PATENT OFFICE
PTO – BOYERS, PA DUTY STATION

PAGE NOT AVAILABLE

PATENT NUMBER 4461146 FOR THE ISSUE DATE 7/24/1984 HAS BEEN SCANNED/LOADED, BUT WITH MISSING PAGE(S). UPON RECEIPT OF THE MISSING PAGE(S), THE ENTIRE DOCUMENT WILL BE RESCANNED. THIS NOTICE IS FOR THE MISSING PAGE CONTAINING:

Missing Columns 1-2 text

DATA CONVERSION OPERATION
BOYERS, PA and forming thereof into said radial zones of fan stream gases, and said ducting further defining a plurality of acruate segmental third channels disposed at the circumference of said crossover chute means and individually communicating with said first channels for effecting said annularizing of a portion of hot gases of said core stream in said annular zone.

3. A mixed flow and swirl augmentor as defined in claim 2, and wherein said plurality of radially extending vanes each comprises:

a vane member pivotally supported by a pivot shaft located substantially centrally of said member and in alignment with a wall of said ducting separating adjacent ones of said first and second channels so as to present minimum resistance to flow in said normal positions and so as to be substantially balanced with respect to flow forces thereon when in said operational positions in which the portion of each said vane to one side of its pivot shaft is in a flow of fan stream gas and the portion to the other side of its pivot shaft is in a flow of core stream gas.

* * * * *